(12) United States Patent
Awad et al.

(10) Patent No.: US 11,870,531 B2
(45) Date of Patent: Jan. 9, 2024

(54) COMMUNICATIONS DEVICE, INFRASTRUCTURE EQUIPMENT AND METHODS

(71) Applicant: Sony Group Corporation, Tokyo (JP)

(72) Inventors: Yassin Aden Awad, Basingstoke (GB); Shin Horng Wong, Basingstoke (GB); Kazuyuki Shimezawa, Basingstoke (GB); Vivek Sharma, Basingstoke (GB); Martin Warwick Beale, Basingstoke (GB)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/894,189

(22) Filed: Aug. 24, 2022

(65) Prior Publication Data

US 2022/0407582 A1    Dec. 22, 2022

Related U.S. Application Data

(63) Continuation of application No. 17/270,037, filed as application No. PCT/EP2019/073604 on Sep. 4, 2019, now Pat. No. 11,456,796.

(30) Foreign Application Priority Data

Sep. 18, 2018   (EP) .................................... 18195309

(51) Int. Cl.
*H04B 7/06* (2006.01)
*H04W 76/19* (2018.01)
(Continued)

(52) U.S. Cl.
CPC .......... *H04B 7/0695* (2013.01); *H04B 7/088* (2013.01); *H04W 72/0453* (2013.01); *H04W 76/19* (2018.02)

(58) Field of Classification Search
CPC . H04B 7/0695; H04B 7/088; H04W 72/0453; H04W 76/19
See application file for complete search history.

(56) References Cited

U.S. PATENT DOCUMENTS

| 11,456,796 B2 * | 9/2022 | Awad .................... H04W 76/19 |
| 2019/0166555 A1 * | 5/2019 | Cheng ............... H04W 52/0216 |

(Continued)

FOREIGN PATENT DOCUMENTS

| JP | 2021507627 A | 2/2021 |
| WO | PCT/CN2017/117937 | 12/2017 |

(Continued)

OTHER PUBLICATIONS

International Search Report and Written Opinion dated Nov. 6, 2019, received for PCT Application PCT/EP2019/073604, Filed on Sep. 4, 2019, 19 pages.

(Continued)

*Primary Examiner* — Kenneth T Lam
(74) *Attorney, Agent, or Firm* — XSENSUS LLP

(57) ABSTRACT

A communications device for use in a wireless communications network providing a wireless access interface within a system bandwidth, the system bandwidth comprising a plurality of bandwidth parts, the communications device comprising a transmitter configured to transmit signals using a plurality of activated bandwidth parts, a receiver configured to receive signals using the plurality of activated bandwidth parts, the received signals being signals transmitted using a plurality of activated beams, and a controller configured to control the transmitter and the receiver so that the communications device is operable: to determine that an activated beam associated with a first bandwidth part satisfies beam failure criteria; to select from the plurality of activated bandwidth parts a second bandwidth part; and to transmit using communications resources associated with (Continued)

the selected second bandwidth part a beam failure indication indicating that the activated beam associated with the first bandwidth part satisfies the beam failure criteria.

19 Claims, 8 Drawing Sheets

(51) Int. Cl.
  *H04B 7/08* (2006.01)
  *H04W 72/0453* (2023.01)

(56) References Cited

U.S. PATENT DOCUMENTS

| | | | |
|---|---|---|---|
| 2019/0173740 A1 | 6/2019 | Zhang et al. | |
| 2019/0208548 A1* | 7/2019 | Shih | H04W 24/10 |
| 2019/0215048 A1 | 7/2019 | Cirik et al. | |
| 2019/0281480 A1 | 9/2019 | Wei et al. | |
| 2019/0297514 A1 | 9/2019 | Pao et al. | |
| 2019/0306867 A1 | 10/2019 | Cirik et al. | |
| 2019/0357292 A1 | 11/2019 | Cirik et al. | |
| 2019/0357300 A1 | 11/2019 | Zhou et al. | |
| 2020/0044723 A1 | 2/2020 | Cirik et al. | |
| 2020/0322035 A1 | 10/2020 | Shi et al. | |
| 2020/0374960 A1 | 11/2020 | Deenoo et al. | |
| 2021/0058132 A1 | 2/2021 | Xu et al. | |
| 2021/0314218 A1 | 10/2021 | Kang et al. | |
| 2021/0314955 A1* | 10/2021 | Zhang | H04L 5/0053 |

FOREIGN PATENT DOCUMENTS

| | | | |
|---|---|---|---|
| WO | WO-2019119399 A1 | 6/2019 | |
| WO | 2020/020734 A1 | 1/2020 | |
| WO | 2020/020738 A1 | 1/2020 | |

OTHER PUBLICATIONS

Catt, "BFR Configurations and Fallback Options", 3GPP TSG-RAN WG2#101-bis, R2-1804482, Apr. 16-20, 2018, pp. 1-4.
Samsung, "Activation/Deactivation of Bandwidth Parts in NR", 3GPP tsg-ran WG2 NR #99bis Meeting, R2-1711189, Oct. 9-13, 2017, 5 pages.
Intel Corporation, "Remaining Issues on Beam Failure Recovery", 3GPP TSG RAN WG1 Meeting #92, R1-1802397, Feb. 26-Mar. 2, 2018, pp. 1-6.
Qualcomm Incorporated, "CA and BWP", 3GPP TSG RAN WG1 NR AdHoc#3, R1-1716440, Sep. 18-21, 2017, pp. 1-7.
Nokia et al., "Beam Recovery—Remaining CP Aspects", 3GPP TSG-RAN WG2 NR Ad hoc 1801, R2-1801085, Jan. 22-26, 2018.
Catt, "BWP for Beam Failure Recovery", 3GPP TSG-RAN WG2 NR Ad hoc 0118, R2-1800160, Jan. 22-26, 2018, pp. 1-4.
Catt, "Further Issues with DL BWP switching for CFRA", 3GPP tsg-ran WG2 AH-1807, R2-1809515, Jul. 2-6, 2018, 6 pages.
Holma et al., "LTE for UMTS OFDMA and SC-FDMA Based Radio Access" Wiley and Sons, pp. 25-27, 2009.
3GPP, "NR; NR and NG-RAN Overall Description", TS 38.300 V15.2.0, Release 15, Jun. 2018, pp. 1-87.
3GPP, "Study on Scenarios and Requirements for Next Generation Access Technologies", TR 38.913 V14.3.0, Release 14, Jun. 2017, pp. 1-39.
NTT Docomo, Inc., "Revised WID on New Radio Access Technology", 3GPP TSG RAN Meeting #78, RP-172834, Dec. 18-21, 2017, 11 pages.
3GPP, "Study on Scenarios and Requirements for Next Generation Access Technologies", TR 38.913 V14.2.0, Release 14, Mar. 2017, pp. 1-38.
Huawei, HiSilicon, "Summary of remaining issues on beam failure recovery", 3GPP TSG RAN WG1 Meeting #92bis, R1-1803637, Apr. 2018, pp. 1-15.
Nokia, Nokia Shanghai Bell, "Further details on BWP switch interaction with RA", 3GPP TSG-RAN WG2 NR Ad hoc 1801, Jan. 2018, R2-1800961, pp. 1-8.
Oppo, "Remaining issues on bandwidth part configuration and activation", 3GPP TSG RAN WG1 Meeting #91, R1-1719975, Nov. 2017, pp. 1-7.
Samsung, "Framework to support bandwidth parts in NR", 3GPP TSG-RAN WG2 NR #99bis Meeting, R2-1711187, Sep. 2017, pp. 1-10.
Vivo, "Remaining issues on beam measurement and reporting", 3GPP TSG RAN WG1 Meeting #94, R1-1808221, Aug. 2018, pp. 1-9.

* cited by examiner

COMMUNICATIONS DEVICE, INFRASTRUCTURE EQUIPMENT AND METHODS

CROSS-REFERENCE TO RELATED APPLICATIONS

The present application is a continuation of U.S. application Ser. No. 17/270,037, filed Feb. 22, 2021, which is based on PCT filing PCT/EP2019/073604, filed on Sep. 4, 2019, which claims priority to EP 18195309.2, filed Sep. 18, 2018, the entire contents of each are incorporated herein by reference.

BACKGROUND

Field

The present disclosure relates to communications devices, infrastructure equipment and methods for the communication by a communications device with an infrastructure equipment in a cell of a wireless communications network.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

Future wireless communications networks will be expected to support communications routinely and efficiently with a wider range of devices associated with a wider range of data traffic profiles and types than current systems are optimised to support. For example it is expected future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance.

In view of this there is expected to be a desire for future wireless communications networks, for example those which may be referred to as 5G or new radio (NR) system/ new radio access technology (RAT) systems [1], as well as future iterations/releases of existing systems, to efficiently support connectivity for a wide range of devices associated with different applications and different characteristic data traffic profiles.

Another example of such a new service is referred to as Ultra Reliable Low Latency Communications (URLLC) services which, as its name suggests, requires that a data unit or packet be communicated with a high reliability and with a low communications delay. URLLC type services therefore represent a challenging example for both LTE type communications systems and 5G/NR communications systems.

The increasing use of different types of communications devices associated with different traffic profiles gives rise to new challenges for efficiently handling communications in wireless telecommunications systems that need to be addressed.

SUMMARY

The present disclosure can help address or mitigate at least some of the issues discussed above.

Embodiments of the present technique can provide a communications device for use in a wireless communications network, the wireless communications network comprising an infrastructure equipment providing a wireless access interface within a system bandwidth, the system bandwidth comprising a plurality of bandwidth parts, the communications device comprising a transmitter configured to transmit signals using a plurality of activated bandwidth parts, a receiver configured to receive signals using the plurality of activated bandwidth parts, the received signals being signals transmitted using a plurality of activated beams, and a controller configured to control the transmitter and the receiver so that the communications device is operable: to determine that an activated beam associated with a first bandwidth part satisfies beam failure criteria; to select from the plurality of activated bandwidth parts a second bandwidth part; and to transmit using communications resources associated with the selected second bandwidth part a beam failure indication indicating that the activated beam associated with the first bandwidth part satisfies the beam failure criteria.

Embodiments of the present technique, which further relate to infrastructure equipment, methods of operating communications devices and infrastructure equipment and circuitry for communications devices and infrastructure equipment, allow for efficient use of resources for measuring and reporting the status of beams used for the transmission of signals on communications resources associated with a plurality of bandwidth parts.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and.

DETAILED DESCRIPTION OF THE EMBODIMENTS

Figure 1:
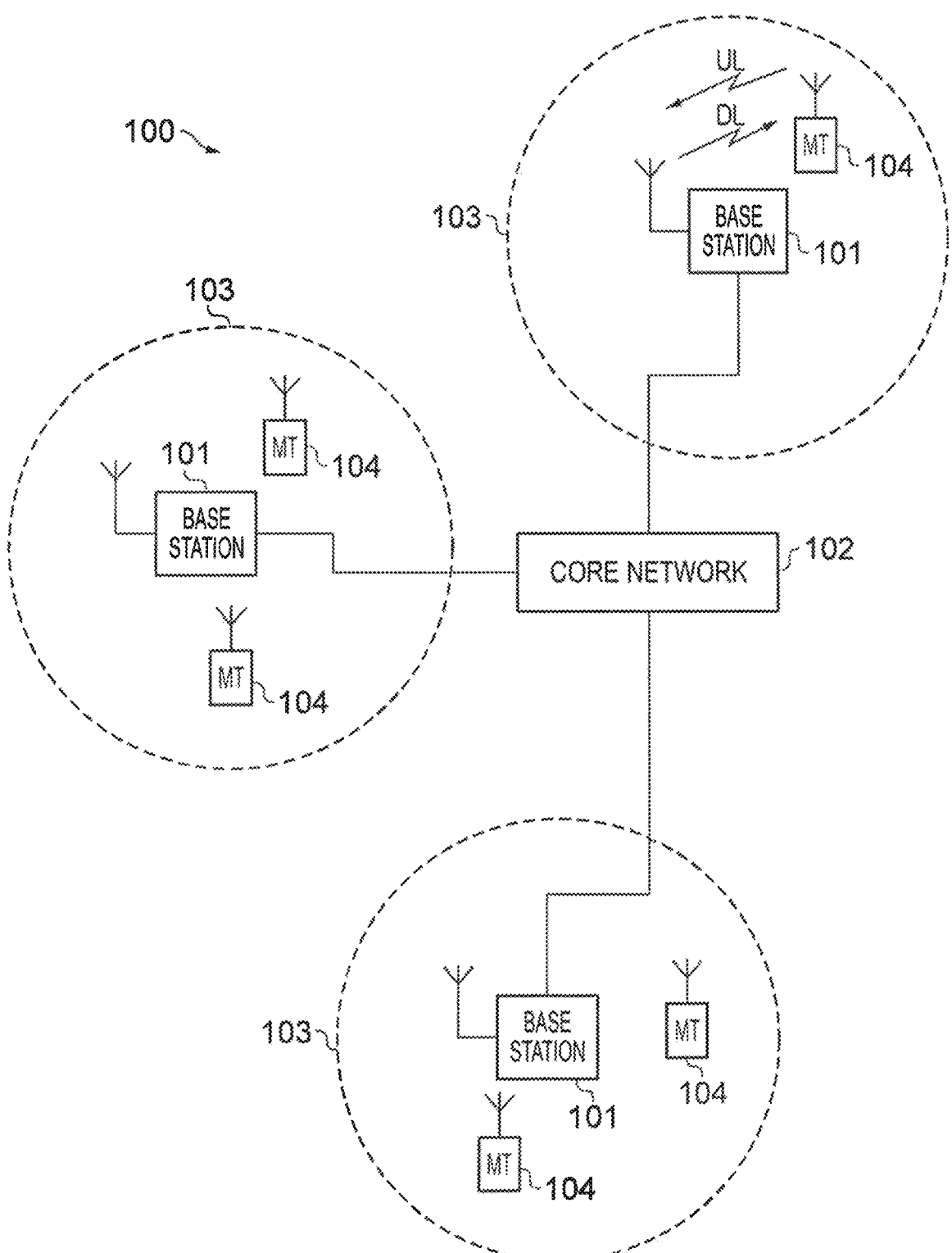
FIG. 1 schematically represents some aspects of a LTE-type wireless telecommunication system which may be configured to operate in accordance with example embodiments of the present disclosure.

Long Term Evolution Advanced Radio Access Technology (4G) FIG. 1 provides a schematic diagram illustrating some basic functionality of a mobile telecommunications network/system 100 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP (RTM) body, and also described in many books on the subject, for example, Holma H. and Toskala A [2]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 100 includes a plurality of base stations 101 connected to a core network part 102. Each base station provides a coverage area 103 (e.g. a cell) within which data can be communicated to and from communications devices 104, and within which a communications device may obtain service. Data is transmitted from the base stations 101 to the communications devices 104 within their respective coverage areas 103 via a radio downlink Data is transmitted from the communications devices 104 to the base stations 101 via a radio uplink. The core network part 102 routes data to and from the communications devices 104 via the respective base stations 101 and provides functions such as authentication, mobility management, charging and so on. Communications devices may also be referred to as mobile stations, user equipment (UE), user terminals, mobile radios, terminal devices, and so forth. Base stations, which are an example of network infrastructure equipment/network access nodes, may also be referred to as transceiver stations/nodeBs/e-nodeBs, g-nodeBs and so forth. In this regard different terminology is often associated with different generations of wireless telecommunications systems for elements providing broadly comparable functionality. However, example embodiments of the disclosure may be equally implemented in different generations of wireless telecommunications systems, and for simplicity certain terminology may be used regardless of the underlying network architecture.

That is to say, the use of a specific term in relation to certain example implementations is not intended to indicate these implementations are limited to a certain generation of network that may be most associated with that particular terminology.

Figure 2:
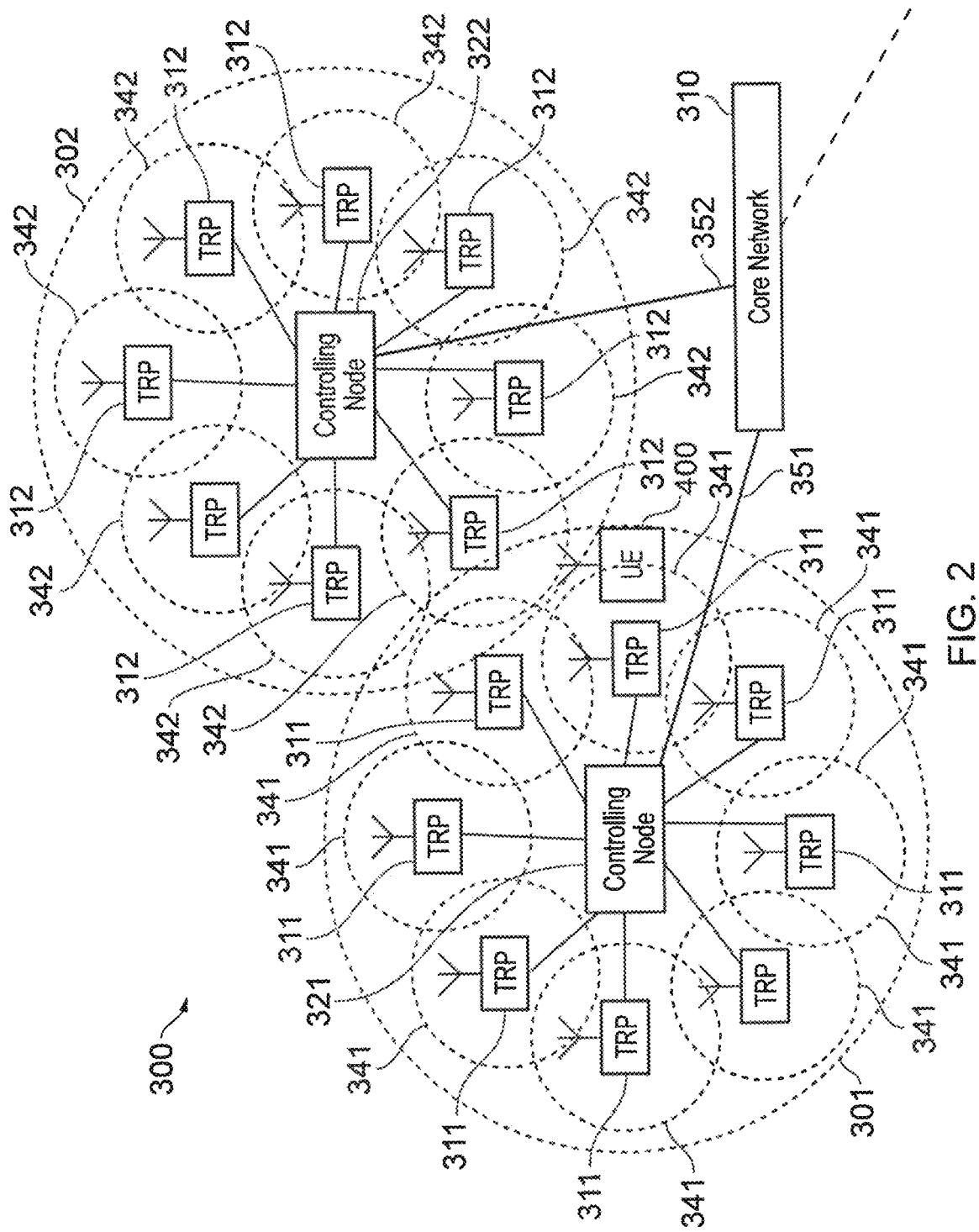
FIG. 2 schematically represents some example aspects of a new radio access technology (RAT) wireless communications network which may be configured to operate in accordance with embodiments of the present disclosure.

FIG. 2 is a schematic diagram illustrating a network architecture for a new RAT wireless communications network/system 300 based on previously proposed approaches which may also be adapted to provide functionality in accordance with embodiments of the disclosure described herein. The new RAT network 300 represented in FIG. 2 comprises a first communication cell 301 and a second communication cell 302. Each communication cell 301, 302, comprises a controlling node (centralised unit) 321, 322 in communication with a core network component 310 over a respective wired or wireless link 351, 352. The respective controlling nodes 321, 322 are also each in communication with a plurality of distributed units (radio access nodes/remote transmission and reception points (TRPs)) 311, 312 in their respective cells. Again, these communications may be over respective wired or wireless links. The distributed units 311, 312 are responsible for providing the radio access interface for communications devices connected to the network. Each distributed unit 311, 312 has a coverage area (radio access footprint) 341, 342 which together define the coverage of the respective communication cells 301, 302.

Each distributed unit 311, 312 includes transceiver circuitry for transmission and reception of wireless signals and processor circuitry configured to control the respective distributed units 311, 312.

In terms of broad top-level functionality, the core network component 310 of the new RAT communications network represented in FIG. 2 may be broadly considered to correspond with the core network 102 represented in FIG. 1, and the respective controlling nodes 321, 322 and their associated distributed units/TRPs 311, 312 may be broadly considered to provide functionality corresponding to the base stations 101 of FIG. 1. The term network infrastructure equipment/access node may be used to encompass these elements and more conventional base station type elements of wireless communications systems. Depending on the application at hand the responsibility for scheduling transmissions which are scheduled on the radio interface between the respective distributed units and the communications devices may lie with the controlling node/centralised unit and/or the distributed units/TRPs.

A communications device 400 is represented in FIG. 2 within the coverage area of the first communication cell 301. This communications device 400 may thus exchange signalling with the first controlling node 321 in the first communication cell via one of the distributed units 311 associated with the first communication cell 301. In some cases communications for a given communications device are routed through only one of the distributed units, but it will be appreciated in some other implementations communications associated with a given communications device may be routed through more than one distributed unit, for example in a soft handover scenario and other scenarios.

The particular distributed unit(s) through which a communications device is currently connected through to the associated controlling node may be referred to as active distributed units for the communications device. Thus the active subset of distributed units for a communications device may comprise one or more than one distributed unit (TRP). The controlling node 321 is responsible for determining which of the distributed units 311 spanning the first communication cell 301 is responsible for radio communications with the communications device 400 at any given time (i.e. which of the distributed units are currently active distributed units for the communications device). Typically this will be based on measurements of radio channel conditions between the communications device 400 and respective ones of the distributed units 311. In this regard, it will be appreciated that the subset of the distributed units in a cell which are currently active for a communications device will depend, at least in part, on the location of the communications device within the cell (since this contributes significantly to the radio channel conditions that exist between the communications device and respective ones of the distributed units).

In at least some implementations the involvement of the distributed units in routing communications from the communications device to a controlling node (controlling unit) is transparent to the communications device 400. That is to say, in some cases the communications device may not be aware of which distributed unit is responsible for routing communications between the communications device 400 and the controlling node 321 of the communication cell 301 in which the communications device is currently operating, or even if any distributed units 311 are connected to the controlling node 26 and involved in the routing of communications at all. In such cases, as far as the communications device is concerned, it simply transmits uplink data to the controlling node 321 and receives downlink data from the controlling node 26 and the communications device has no awareness of the involvement of the distributed units 311, though may be aware of radio configurations transmitted by distributed units 311. However, in other embodiments, a communications device may be aware of which distributed unit(s) are involved in its communications. Switching and scheduling of the one or more distributed units may be done at the network controlling node based on measurements by the distributed units of the communications device uplink signal or measurements taken by the communications device and reported to the controlling node via one or more distributed units.

In the example of FIG. 2, two communication cells 301, 302 and one communications device 400 are shown for simplicity, but it will of course be appreciated that in practice the system may comprise a larger number of communication cells (each supported by a respective controlling node and plurality of distributed units) serving a larger number of communications devices.

It will further be appreciated that FIG. 2 represents merely one example of a proposed architecture for a new RAT communications system in which approaches in accordance with the principles described herein may be adopted, and the functionality disclosed herein may also be applied in respect of wireless communications systems having different architectures.

Thus example embodiments of the disclosure as discussed herein may be implemented in wireless telecommunication systems/networks according to various different architectures, such as the example architectures shown in FIGS. 1 and 2. It will thus be appreciated the specific wireless communications architecture in any given implementation is not of primary significance to the principles described herein.

In this regard, example embodiments of the disclosure may be described generally in the context of communications between network infrastructure equipment/access nodes and a communications device, wherein the specific nature of the network infrastructure equipment/access node and the communications device will depend on the network infrastructure for the implementation at hand. For example, in some scenarios the network infrastructure equipment/access node may comprise a base station, such as an LTE-type base station 101 as shown in FIG. 1 which is adapted to provide functionality in accordance with the principles described herein, and in other examples the network infrastructure equipment/access node may comprise a control unit/controlling node 321, 322 and/or a TRP 311, 312 of the kind shown in FIG. 2 which is adapted to provide functionality in accordance with the principles described herein.

The embodiments of the present invention can find application with advanced wireless communications systems such as those referred to as 5G or New Radio (NR) Access Technology. Systems incorporating NR technology are expected to support different services (or types of services), which may be characterised by different requirements for latency, data rate and/or reliability. For example, Enhanced Mobile Broadband (eMBB) services are characterised by high capacity with a requirement to support up to 20 Gb/s. The requirements for Ultra Reliable & Low Latency Communications (URLLC) [1] services are for a reliability of $1\text{-}10^{-5}$ (99.999%) for one transmission of a 32 byte packet with a user plane latency of 1 ms [3]. Massive Machine Type Communications (mMTC) is another example of a service which may be supported by NR-based communications networks.

The elements of the wireless access network shown in FIG. 1 may be equally applied to a 5G new RAT configuration, except that a change in terminology may be applied as mentioned above.

Bandwidth Part

A communications device and an infrastructure equipment, such as the communications device 104 and infrastructure equipment 101 of FIG. 1, are configured to communicate via a wireless access interface. The wireless access interface may comprise one or more carriers, each providing, within a range of carrier frequencies, communications resources for transmitting and receiving signals according to a configuration of the wireless access interface. The one or more carriers may be configured within a system bandwidth provided for the wireless communications network of which the infrastructure equipment 101 forms part. Each of the carriers may be divided in a frequency division duplex scheme into an uplink portion and a downlink portion and may comprise one or more bandwidth parts (BWPs). A carrier may be configured therefore with a plurality of different BWP for a communications device to transmit or receive signals.

The nature of the wireless access interface may be different amongst the different BWPs. For example, where the wireless access interface is based on orthogonal frequency division multiplexing, different BWPs may have different sub-carrier spacing, symbol periods and/or cyclic prefix lengths. BWPs may have different bandwidths.

By configuring BWPs appropriately, the infrastructure equipment may provide BWPs which are suited for different types of services. For example, a BWP more suitable for eMBB may have a larger bandwidth in order to support high data rates. A BWP suited for URLLC services may use a higher sub-carrier spacing and shorter slot durations, in order to permit lower latency transmissions.

Parameters of the wireless access interface which are applicable to a BWP may be referred to collectively as the numerology of a BWP. Examples of such parameters are sub-carrier spacing, symbol and slot durations and cyclic prefix length.

Figure 3:
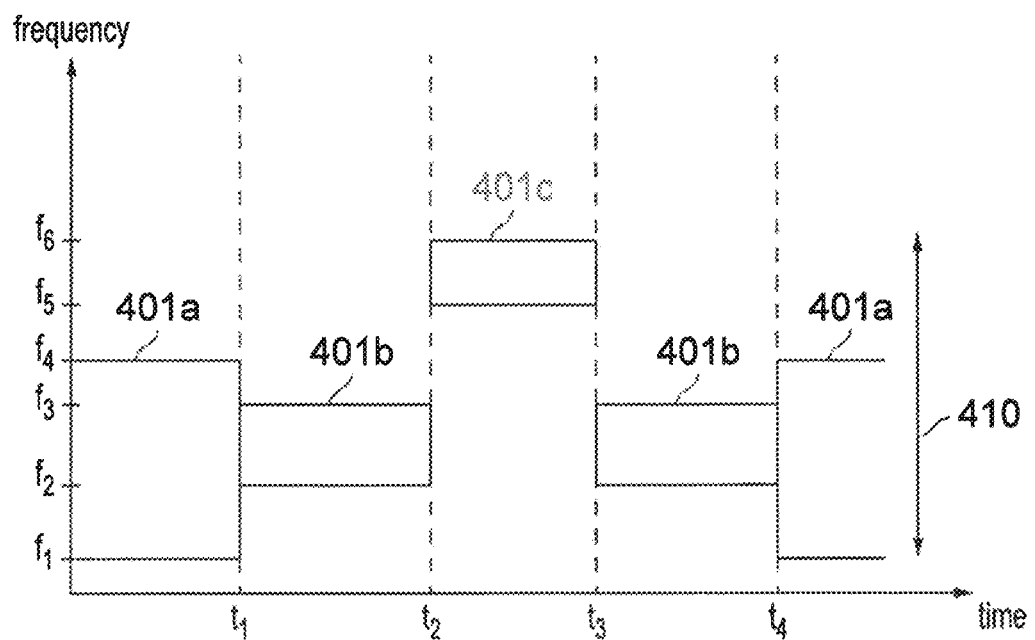
FIG. 3 illustrates a portion of a wireless access interface, in which the system bandwidth comprises multiple bandwidth parts which may be activated and deactivated independently.

FIG. 3 shows an example of first to third BWPs 401a-c configured within a system bandwidth 410 extending from frequency f1 to frequency f6. The following Table 1 provides a summary of the characteristics of each of the BWPs 401a-c:

TABLE 1

Summary of BWP characteristics

| BWP | Index (bwp-id) | Frequency range | Sub-carrier spacing |
| --- | --- | --- | --- |
| 401a | 1 | f1-f4 | 15 kHz |
| 401b | 2 | f2-f3 | 15 kHz |
| 401c | 3 | f5-f6 | 60 kHz |

As shown in Table 1, each BWP may be identified by an index number (bwp-id).

In the example in FIG. 3, the BWPs 401a-c do not collectively span the entire system bandwidth 410. However, in some examples, the frequency range of one or more BWPs collectively span the system bandwidth 410 (in other words, all frequencies in the system bandwidth may fall within at least one BWP). A frequency range of a BWP may be entirely within the frequency range of another BWP (in this case, the second BWP 401b is within the bandwidth of the first BWP 401a).

A BWP may comprise communications resources for uplink or downlink communications. For a communications device, an uplink (UL) BWP and a downlink (DL) BWP may be independently configured, and an association (e.g. pairing) of an UL BWP and a DL BWP may be configured. In some embodiments, uplink and downlink communications resources are separated in time, in which case time division duplexing (TDD) may be used. In case of TDD, a BWP-pair (UL BWP and DL BWP with the same bwp-id) may have the same centre frequency. In some embodiments uplink and downlink communications resources are separated in frequency, in which case frequency division duplexing (FDD) may be used. Where FDD is used, a UL BWP and a DL BWP may comprise two non-contiguous frequency ranges, one comprising communications resources for uplink communications and one comprising communications resources for downlink communications. In the remainder of the present disclosure, the term 'bandwidth part' (BWP) is used to refer to a pair of associated uplink and downlink bandwidth parts and as such, may comprise communications resources for both uplink and downlink transmissions. The terms 'uplink bandwidth part' and 'downlink bandwidth part' will be used where appropriate to refer to a bandwidth part comprising only, respectively, uplink communications resources and downlink communications resources.

An activated BWP refers to a BWP which may be used for the transmission or reception of data to or from the communications device 104. An infrastructure equipment may schedule transmissions to or by the communications device 104 only on a BWP if that BWP is currently activated for the communications device 104.

On deactivated BWPs, the communications device 104 may not monitor a PDCCH and may not transmit on PUCCH, PRACH and UL-SCH.

Conventionally, as illustrated in FIG. 3, at most one BWP providing uplink communications resources and at most one BWP providing downlink communications resources may be activated at any given time in respect of a particular communications device. In the example of FIG. 3, initially (prior to time t1), only the first BWP 401a is activated. At time t1, the first BWP 401a is deactivated and the second BWP 401b is activated. Subsequently, at time t2, the second BWP 401b is deactivated. From t2 to t3, only the third BWP 401c is activated; from t3 to t4 only the second BWP 401b is activated, and at t4, the first BWP 401a is activated and the second BWP 401b is deactivated.

In light of the differing numerologies which may be applicable to BWPs, a single activated BWP may not be suitable for the transmission of data associated with different services, if those different services have different requirements (e.g. latency requirements) or characteristics (e.g. bandwidth/data rate). Additionally or alternatively, there may be insufficient capacity on a single BWP for the requirements of a single communications device. Therefore, consideration has been given to the possibility of activating multiple BWPs for a single communications device.

Prior to being activated, a BWP may be configured for use by the communications device 104. That is, the communications device 104 may determine the characteristics of the BWP, for example, by means of radio resource control (RRC) signalling transmitted by the infrastructure equipment 101.

Beams

According to some radio access technologies, including the new radio (NR) radio access technologies under development by 3GPP, a cell may be formed (or, in other words, 'generated') by a plurality of directional beams. Each beam may be characterised by a variance in gain with respect to a direction from the antenna; a beam may be considered 'wide', where the gain is consistently relatively high over a broad range of directions, or 'narrow', where relatively high gain is only achieved over a narrow range of directions. Depending on the direction of the communications device with respect to the infrastructure equipment, the gain of a particular beam may be sufficiently high (and the resulting coupling loss sufficiently low) to permit communications between the communications device and the infrastructure equipment via the beam.

Beams may be formed for transmitting or receiving at the infrastructure equipment using phased antenna arrays, directional antennas, a combination of both, or other known techniques.

Communications resources such as a particular BWP may be associated with one or more beams. In other words, the infrastructure equipment may transmit or receive using communications resources on all, or some subset of beams. A beam may be said to be 'activated' in respect of communications resources, if the infrastructure equipment transmits or receives on those communications resources using that beam. For example, one or more beams may be activated in respect of a BWP. Different communications devices within the same cell may use different sets of beams.

However, there is a need to provide efficient means to monitor and manage the usage of multiple beams in a scenario where multiple BWPs have been activated for a single communications device.

According to embodiments of the present disclosure, there is provided communications device for use in a wireless communications network, the wireless communications network comprising an infrastructure equipment providing a wireless access interface within a system bandwidth, the system bandwidth comprising a plurality of bandwidth parts, the communications device comprising a transmitter configured to transmit signals using a plurality of activated bandwidth parts, a receiver configured to receive signals using the plurality of activated bandwidth parts, the received signals being signals transmitted by the infrastructure equipment using a plurality of activated beams, and a controller. The controller is configured to control the transmitter and the receiver so that the communications device is operable: to select a first bandwidth part from the plurality of activated bandwidth parts; to determine that an activated beam associated with the selected first bandwidth part satisfies beam failure criteria; to select from the plurality of activated bandwidth parts a second bandwidth part; to transmit to the infrastructure equipment using resources associated with the selected second bandwidth part a beam failure indication indicating that the activated beam associated with the selected first bandwidth part satisfies the beam failure criteria.

Initial, Primary and Default BWPs

A BWP may be designated as an initial BWP, which provides the control resource set for downlink information used to schedule downlink transmissions of system information.

A BWP may be designated as a primary BWP which is always activated and which may be used for transmitting control information to or by the communications device 104. Since the primary BWP is always activated and thus may be used for data transmission, it may only be necessary to activate one or more further (secondary) BWPs if the primary BWP is unsuitable for an ongoing or new service or insufficient e.g. due to congestion or lack of bandwidth.

Alternatively or additionally, a BWP may be designated as a default BWP If no BWP is explicitly configured as a default BWP, a BWP which is designated as the initial BWP may be the default BWP.

A default BWP may be defined as a BWP that a UE falls back to after an inactivity timer, associated with a BWP other than the default BWP, expires. For example, where a non-default BWP is deactivated as a result of an associated inactivity timer expiring, and no other non-default BWP is activated, then a default BWP may be activated in response.

A default BWP may have an activation or deactivation priority which differs from the activation or deactivation priority of other, non-default, BWPs. A default BWP may be preferentially activated and/or may be deactivated with lowest preference. For example, a default BWP may remain activated unless and until a further BWP is to be activated such that a maximum number of activated BWPs would be exceeded.

A default BWP may further be preferentially used for transmitting an indication that a different BWP is to be activated or de-activated.

Figure 4:
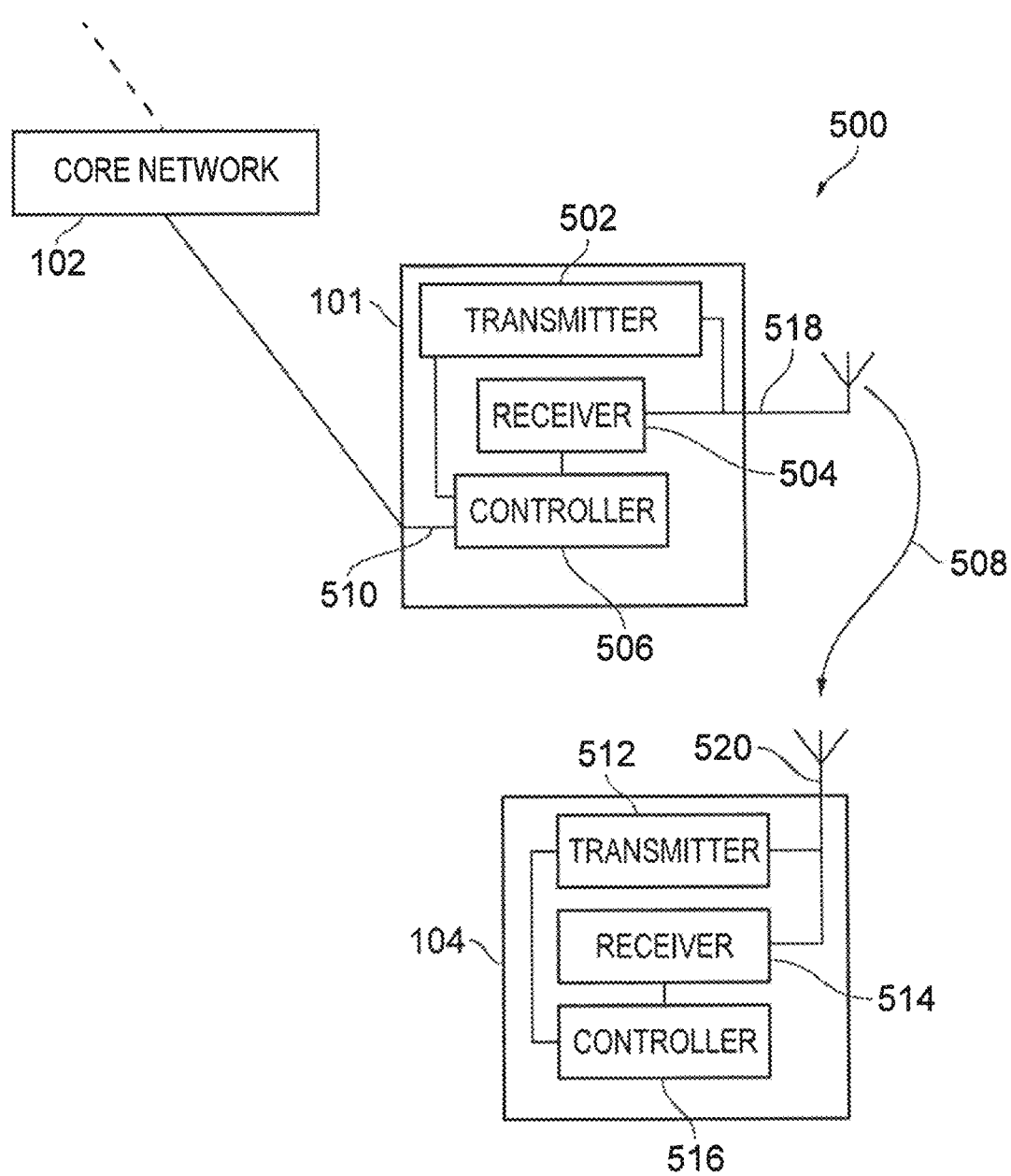
FIG. 4 schematically shows a telecommunications system according to an embodiment of the present disclosure.

FIG. 4 schematically shows a telecommunications system 500 according to an embodiment of the present disclosure. The telecommunications system 500 in this example is based broadly around an LTE-type architecture. As such many aspects of the operation of the telecommunications system/network 500 are known and understood and are not described here in detail in the interest of brevity. Operational aspects of the telecommunications system 500 which are not specifically described herein may be implemented in accordance with any known techniques, for example according to the current LTE-standards.

The telecommunications system 500 comprises a core network part 102 coupled to a radio network part. The radio network part comprises the infrastructure equipment (which may be an evolved-node B) 104 coupled, via a wireless access interface illustrated generally by arrow 508, to a communications device 104 (which may also be referred to as terminal devices). It will of course be appreciated that in practice the radio network part may comprise a plurality of base stations serving a larger number of communications devices across various communication cells. However, only a single infrastructure equipment and single communications device are shown in FIG. 4 in the interests of simplicity.

As noted above, the operation of the various elements of the communications system 500 shown in FIG. 4 may be broadly conventional apart from where modified to provide functionality in accordance with embodiments of the present disclosure as discussed herein.

The infrastructure equipment 101 is connected to the core network 102 via an interface 510 to a controller 506. The infrastructure equipment 101 includes a receiver 504 connected to an antenna 518 and a transmitter 502 connected to the antenna 518. The receiver 504 and the transmitter 502 are both connected to the controller 506. The controller 506 is configured to control the infrastructure equipment 101 and may comprise processor circuitry which may in turn comprise various sub-units/sub-circuits for providing functionality as explained further herein. These sub-units may be implemented as discrete hardware elements or as appropriately configured functions of the processor circuitry. Thus the controller 506 may comprise circuitry which is suitably configured/programmed to provide the desired functionality using conventional programming/configuration techniques for equipment in wireless telecommunications systems. The transmitter 502, receiver 504 and controller 506 are schematically shown in FIG. 4 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the infrastructure equipment 101 will in general comprise various other elements associated with its operating functionality.

Correspondingly, the communications device 104 includes a controller 516 connected to a receiver 514 which receives signals from an antenna 520. The controller 516 is also connected to a transmitter 512 which is also connected to the antenna 520. The controller 516 is configured to control the communications device 104 and may comprise processor circuitry which may in turn comprise various sub-units/sub-circuits for providing functionality as explained further herein. These sub-units may be implemented as discrete hardware elements or as appropriately configured functions of the processor circuitry. Thus the controller 516 may comprise circuitry which is suitably configured/programmed to provide the desired functionality using conventional programming/configuration techniques for equipment in wireless telecommunications systems. The transmitter 512, receiver 514 and controller 516 are schematically shown in FIG. 4 as separate elements for ease of representation. However, it will be appreciated that the functionality of these elements can be provided in various different ways, for example using one or more suitably programmed programmable computer(s), or one or more suitably configured application-specific integrated circuit(s)/ circuitry/chip(s)/chipset(s). As will be appreciated the communications device 104 will in general comprise various other elements associated with its operating functionality, for example a power source, user interface, and so forth, but these are not shown in FIG. 4 in the interests of simplicity.

Beam Management

Figure 5A:
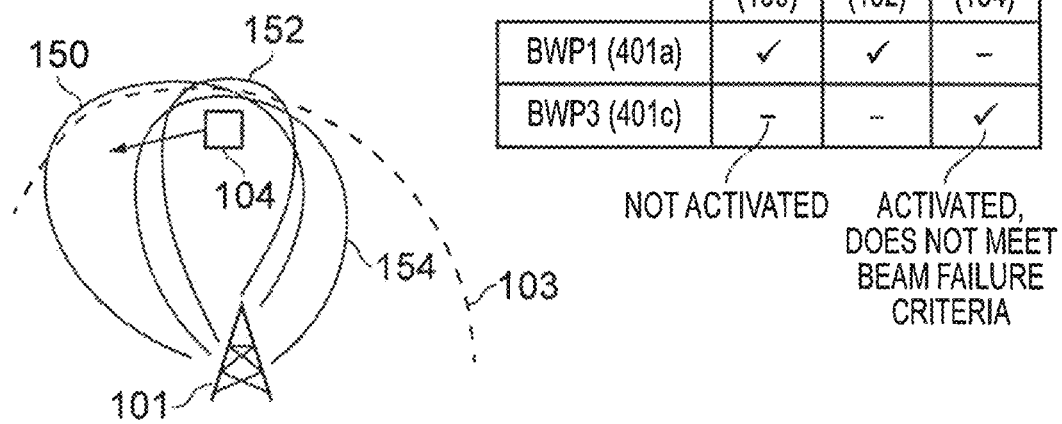
FIG. 5A and FIG. 5B illustrate in plan view an example configuration of a beams within a cell configured according to embodiments of the present techniques.
Figure 5B:
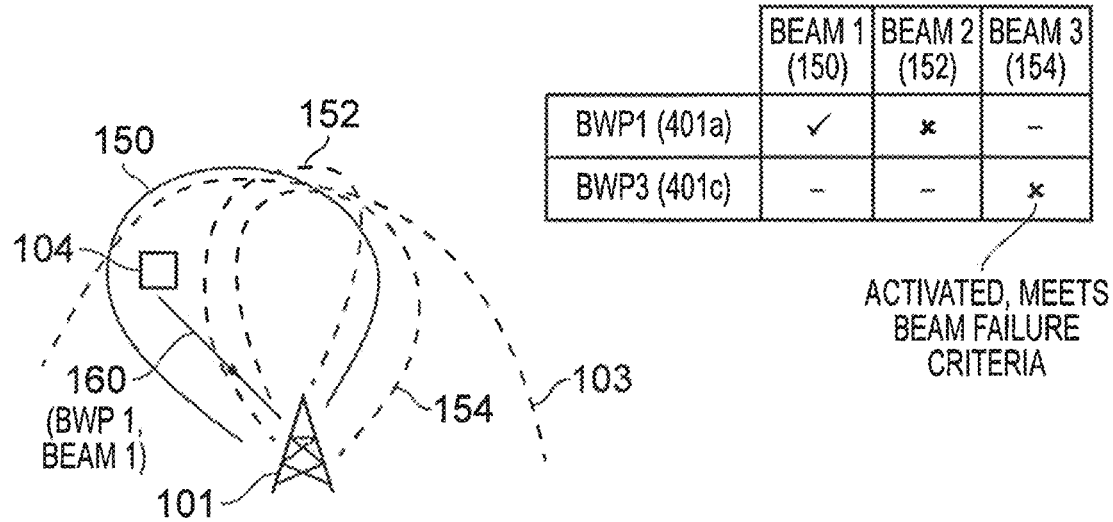

FIGS. 5A and 5B show in plan view a use of multiple beams within the cell 103, their activation for BWPs, and a notification message sent from the communications device 104, which may be in accordance with embodiments of the present technique.

In the example shown in FIG. 5, to form the cell 103, the infrastructure equipment 101 forms a number of beams, of which only a first beam 150, a second beam 152 and a third beam 154 are shown.

The infrastructure equipment 101 may configure the communications device 104 by means of, for example, RRC configuration, with one or more beams including the first to third beams 150, 152, 154. All or a subset of these configured beams may be activated for transmission of signals representing data to the communications device by the infrastructure equipment. The activated beams may be used for the transmission of control or data, including control messages including initial access messages, mobility management control messages, and user data from higher protocol levels (such as non access stratum user plane data).

Communications resources of a BWP may be associated with one or more activated beams. For example, as shown in the table of FIG. 5A, first and second beams 150 and 152 may be associated with (or 'activated' in respect of) the first BWP 401a; similarly, the third beam 154 may be activated for the third BWP 401c.

Certain communications resources may be preconfigured for use for transmissions on only a single beam. The communications device 104 may be aware of the mapping of these communications resources to beam(s) by means of RRC configuration or other means. Communications resources which are used for transmissions on a single beam may be used by the infrastructure equipment to transmit reference signals or synchronisation signals. Alternatively or additionally, transmissions using a beam may include an indication of an identity of the beam.

The communications device 104 may measure signals transmitted on configured beams, whether or not they are activated. These signals may comprise channel state information reference signals (CSI-RS) or synchronisation signal blocks (SSB) transmitted using predetermined communications resources associated with a single beam. By measuring these signals, the communications device 104 can determine whether a particular beam meets predetermined beam failure criteria. Beam failure criteria may be satisfied if, for example, a received signal strength and/or a received signal quality fall below a predetermined beam failure threshold. This may occur as a result of signal blockage or rotation or movement of the communications device 104.

For example, in the example shown in FIG. 5A, the communications device 104 is within the high gain region of the first to third beams 150, 152, 154. As indicated by the 'tick' marks in the table, in the situation represented in FIG. 5A, none of the beams which are activated for one of the activated BWPs satisfy the beam failure criteria.

However, the communications device 104 may be moving, as indicated by the arrow 156. After some time, the situation may be as shown in FIG. 5B, in which the communications device 104, having moved relative to the infrastructure equipment 101, is no longer within the high gain regions of the second and third beams 152, 154. As a result, based on measurements are performed by the communications device 104 of received signals which were transmitted on communications resources used only for transmissions using the second and/or third beams 152, 154, or which are otherwise identifiable as being transmitted using those beams, the communications device 104 determines that the signal strength and/or signal quality of those signals are below the respective predetermined beam failure threshold and that the beams have therefore satisfied the beam failure criteria. To indicate this, the second and third beams 152, 154 are shown in FIG. 5B with dashed, rather than solid, lines, and the ticks of the table of FIG. 5A have been replaced by crosses to indicate this.

In response to this determination, then in accordance with embodiments of the present technique as will be described in further detail below, the communications device 104 may transmit a beam failure indication 160 to the infrastructure equipment 101. The beam failure indication 160 in the example of FIG. 5B may indicate that the second and third beams 152, 154 have satisfied the beam failure criteria.

In response, the infrastructure equipment 101 may adapt the number and characteristics of the beams of a cell over time. Alternatively or additionally, the infrastructure equipment 101 may de-activate or activate one or more beams in respect of a particular BWP.

For example, the infrastructure equipment 101 may modify the set of activated beams, for example, by transmitting an indication (not shown) to the communications device 104 that a configured fourth beam (not shown) is now to be activated, and that the currently activated second and third beams 152, 154 are to be deactivated.

Beam management as used herein refers collectively to processes and techniques such as those described in the example above, and which may include one or more of the measurement of signals transmitted on one or more beams, an assessment as to whether one or more beams satisfy respective beam failure criteria, indications (such as the beam failure indication 160) transmitted by the communications device 104 to the infrastructure equipment using an activated BWP to indicate whether or not one or more beams satisfy respective beam failure criteria, the configuration or activated set of beams are modified, and transmissions indicating control information relating to the beams sent using an activated beam which has not satisfied the beam failure criteria.

Beam Failure Recovery

As has been described above, provided at least one activated beam remains available for communication, then beam management processes can update and adapt the set of activated beams in response to one or more beams becoming unsuitable.

However, should all activated beams satisfy the beam failure criteria, then it is necessary to initiate a procedure to recover from this situation. This procedure is referred to as beam failure recovery. Since all activated beams satisfy the beam failure criteria, the beam management procedures described above are not appropriate.

In an example beam failure recovery procedure initiated in response to a determination that all activated beams satisfy the respective beam failure criteria, the communications device 104 performs measurements of the signal strength (e.g. reference signal received power, RSRP) of the CSI-RS or SSB associated with one or more beams which are configured but not activated, such as the fourth beam.

The measurements may be compared against a predetermined threshold, such as an RSRP threshold. If the communications device 104 determines that the measurements associated with the fourth beam exceed the predetermined threshold, then the communications device 104 transmits a beam failure recovery request message (which is an example of a beam failure indication) as a random access message using a physical random access channel (PRACH) of the new identified beam.

Communications resources on the PRACH may have been previously indicated as suitable for non-contention based random access transmissions, in which case the beam failure recovery request message may be transmitted in a contention-free manner using those resources; otherwise, the beam failure recovery request message may be transmitted in a contention based manner.

After transmitting the beam failure recovery request message, the communications device 104 monitors downlink communications resources associated with the new identified beam. More specifically, the communications device 104 may monitor a configured recovery search space, which may be a 'recoverySearchSpace', having as an identity a 'recovery SearchSpaceId', for downlink control information (DCI).

If the communications device 104 receives downlink control information in the configured communications resources, which indicates that communications resources on a shared downlink channel (such as the physical downlink shared channel, PDSCH) are scheduled to be used for the transmission by the infrastructure equipment 101 of a response to the beam failure recovery request message, then the communications device 104 determines that the beam failure recovery is successful.

In response to receiving the downlink control information, the communications device 104 sets the new identified beam as an activated beam. The new (activated) beam can be used for subsequent communications between the infrastructure equipment 101 and the communications device 104, including the transmission of control information to indication one or more beams which are to be activated for the communications device. The communications device 104 may decode and process data transmitted using the scheduled communications resources on the shared downlink channel, for example in a conventional manner Beam Management Resources Collectively, communications resources associated with assessment of a beam against its beam failure criteria, beam management and the beam failure recovery procedure may be referred to as beam management resources. These may include downlink resources on which CSI reference signals or SSB are transmitted, uplink PRACH resources, and the recovery search space. Where beam management resources are associated with a BWP, all of the beam management resources may exist within the BWP; alternatively some portion of the beam management resources, such as downlink SSB communications resources, which are associated with a BWP may comprise communications resources which are not within the communications resources of the respective BWP.

Not all BWPs may be configured with beam management resources. In the event that beam failure of all activated beams on a given activated BWP is detected and there are no (or insufficient) beam management resources on that BWP for carrying out the beam failure recovery procedure, then the communications device 104 may be unable to carry out the beam failure recovery procedure until it moves and/or a BWP is activated which does have the necessary beam management resources. Alternatively, the criteria for radio link failure may be determined to be satisfied.

Radio Link Failure

A radio link quality associated with a serving cell (such as the cell 103) may be assessed periodically, such as once in each predefined time duration. The cell's radio link quality may be determined based on measurements of signals transmitted on resources associated with the activated BWP. Predetermined thresholds are used, together with the assess radio link quality, to determine whether a cell which is currently in-sync should be declared to higher layers as being out-of-sync, or vice versa.

Beam Management and Beam Failure with Multiple Activated BWPs

According to some embodiments of the present technique, a single set of beam management resources and common beam failure criteria, comprising a beam failure threshold, are used in respect of all beams and all BWPs.

In such embodiments, a same set of beams may be used for each activated BWP for a given communications device. For example, in contrast to the scenario illustrated in FIG. 5A, in some embodiments, the first to third beams 150, 152, 154 may be activated in respect of each of a plurality of activated BWPs, such as the first and third BWPs 401a, 401c.

Alternatively, the same set of beams are used for channels of the same type of each activated BWP; for example, a set of PDCCH beams may be used for any PDCCH transmissions, regardless of the BWP on which they occur; similarly, all PDSCH transmissions, on all activated BWPs, use the same set of beams, although this set may differ from the PDCCH beams.

Beam management resources may be configured on only one of the activated BWPs, even if two or more BWPs are activated. A single beam failure threshold, applicable to all activated beams and all activated BWPs may be pre-determined, e.g. signalled to the communications device 104 by the infrastructure equipment 101.

Figure 6:
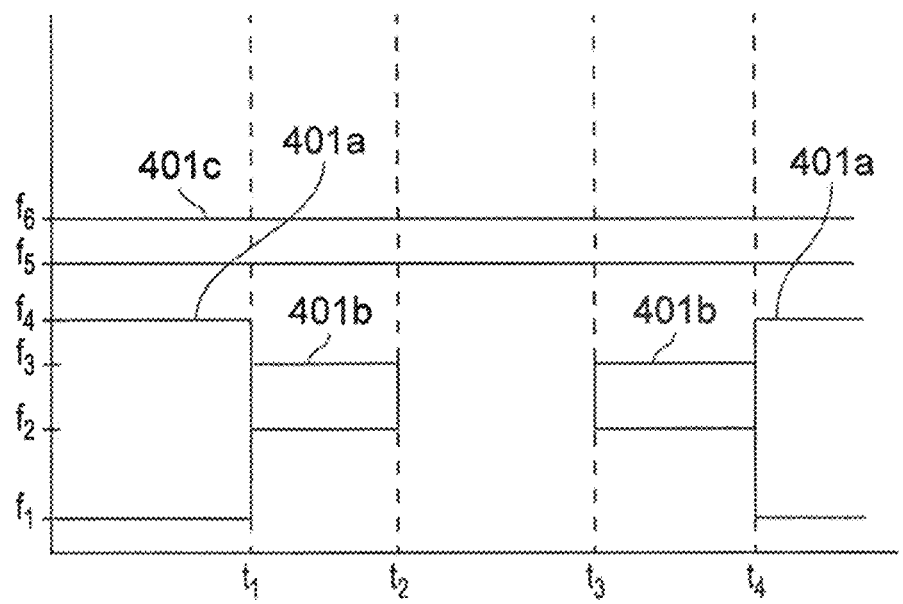
FIG. 6 illustrates a portion of a wireless access interface, in which the system bandwidth comprises multiple bandwidth parts which may be activated and deactivated independently and in which one of the bandwidth parts is designated as a primary bandwidth part.

FIG. 6 illustrates first to third BWPs 401a-c configured as described above in respect of FIG. 3; however, in the embodiment illustrated in FIG. 6, the third BWP 401c is designated as a primary BWP and, as such, remains activated, irrespective of whether one or more of the other (secondary) BWPs 401a, 401b are activated.

Where one of the configured BWPs is designated as a primary BWP as in the example illustrated in FIG. 6, the beam management resources may be configured only on the primary BWP (that is, on the third BWP 401c of FIG. 6).

If there is no designated primary BWP, and one of the configured BWPs is designated as a default BWP then, according to embodiments of the present technique, when the default BWP is activated, the beam management resources are configured on the default BWP. In addition, beam management resources may be configured on a further non-default BWP in accordance with a predetermined prioritisation scheme, for use in the case that the default BWP is not activated.

Thus, where a configured BWP is designated as the default BWP and the default BWP is not activated, or where no configured BWP is designated as the default BWP, or in any case, then beam management resources may be configured on an activated BWP which is not designated as the default BWP.

The communications device may determine which one of the activated BWPs is configured with beam management resources in accordance with the predetermined prioritisation scheme. The activated BWP having the configured beam management resources may be determined, in accordance with the predetermined prioritisation scheme, based on one or more characteristics of the BWP (e.g. index number, bandwidth, sub-carrier spacing, and a network-assigned priority). Network-assigned priorities may be assigned explicitly or implicitly to each activated BWP, and preferably additionally to each configured BWP.

For example, in accordance with the predetermined prioritisation scheme, the beam management resources may be configured on the activated BWP having the highest sub-carrier spacing and, where there are two or more having the same (highest) sub-carrier spacing, the BWP of those two or more which has the highest index number.

In another example, in accordance with the predetermined prioritisation scheme, the BWP which is configured with the beam management resources may be the activated BWP having the highest network-assigned priority.

Figure 7:
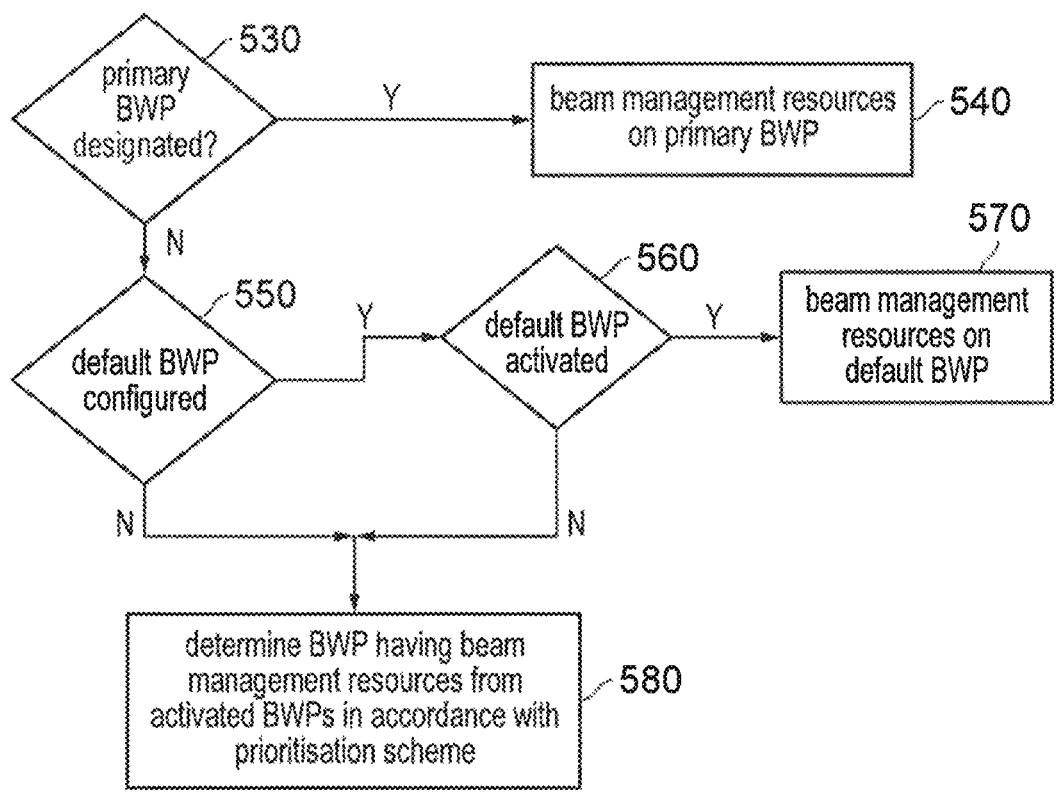
FIG. 7 illustrates a process flow chart for a communications device in accordance with embodiments of the present technique.

A process which may be implemented in the communications device 104 for determining on which BWP beam management resources are configured is shown in FIG. 7.

The process of FIG. 7 starts at step 530 in which the communications device 104 determines whether one of the configured BWPs is designated as the primary BWP. If one is, then control passes to step 540, in which the communications device 104 determines that the beam management resources are configured on the BWP which is designated as the primary BWP.

If, at step 530, the communications device 104 determines that no configured BWP is designated as the primary BWP, then control passes to step 550.

At step 550, the communications device 104 determines whether one of the configured BWPs is designated as a default BWP. If one is, then control passes to step 560 in which the communications device 104 determines whether the default BWP is activated. If it is, then control passes to step 570 in which the communications device 104 determines that the beam management resources are configured on the BWP which is designated as the default BWP.

If at step 550 it is determined that no configured BWP is designated as a default BWP, or it is determined at step 560 that the default BWP is not activated, then control passes to step 580, in which the communications device 104 determines the BWP on which beam management resources are configured in accordance with the predetermined prioritisation scheme.

One or more of the steps of the process of FIG. 7 may be omitted, and the order of the steps may be altered. For example, in some embodiments, there may be no possibility to designate a BWP as a primary BWP, in which case steps 530 and 540 may be omitted, and the process may start at step 550.

In some embodiments, measurements of signals transmitted using the activated beams are measured on communications resources of the BWP on which the beam management resources are configured.

In some embodiments, a single beam failure threshold against which the results of the measurements are compared may applicable regardless of the BWP on which the beam management resources are configured.

In some embodiments, the beam failure threshold may depend on the BWP on which the beam management resources are configured; for example, a beam failure threshold may be configured for each configured BWP, and the applicable beam failure threshold (i.e. the one against which the measurements are compared) may be the one associated with the BWP on which the beam management resources are configured.

In some embodiments, beam management resources may be configured on multiple configured BWPs.

In some embodiments, the process of FIG. 7 may be modified to identify in addition, or alternatively, which beam management resources should be used and/or which beam failure threshold to apply. Specifically, the process of FIG. 7 may be modified to determine a BWP which has associated beam management resources to be used and/or the beam failure threshold to be used.

The process of FIG. 7 may be used to determine on which BWP beam management resources in response to determining that one or more beams have been determined as satisfying the beam failure criteria. The beam failure indication 160 may be transmitted on beam management resources of the BWP which is selected in accordance with the process of FIG. 7.

Where the process of FIG. 7 is initiated in response to determining that all activated beams satisfy the beam failure criteria and that beam failure recovery is required, the beam failure recovery may be triggered using the communications resources of the determined BWP.

In some embodiments, the infrastructure equipment configures beam management resources on a single (activated) BWP. The identity of this BWP is indicated to the communications device 104, either in advance or when the default BWP is deactivated. The indication may be in downlink control information (DCI) transmitted on a physical downlink control channel (PDCCH) or in a layer 2 (L2) signalling message e.g. a radio resource control configuration message (such as an RRC Reconfiguration message), or medium access control (MAC) control element.

In embodiments where a single set of beam management resources are used, beam management occurs using the single applicable set of beam management resources, independent of the number of activated BWPs. As such, the BWP associated with the communications resources on which measurements are made for the purposes of evaluating the beam failure criteria, and the BWP on which a resulting indication may be transmitted are the same BWP.

In other words, the communications device 104 may perform measurements of signals transmitted on one or more beams, using communications resources associated with the BWP in which the beam management resources are determined to be located. Accordingly, the communications device 104 may transmit measurement results to the infrastructure equipment using communications resources of the same BWP, which may in response modify the set of beams (and/or characteristics of the beams) to be used for all activated BWPs for the communications device 104.

Similarly, a beam failure recovery procedure (comprising a transmission on a PRACH using a non-activated beam associated with a BWP) is triggered when the characteristics of downlink reference signals received on all beams, on the beam management resources associated with the BWP, fall below the beam failure threshold.

According to some embodiments of the present technique, beam management resources are configured for each activated BWP. In such embodiments, the set of beams used for each BWP need not be the same. In some embodiments, beam failure criteria may be configured for each BWP and need not be the same for all BWPs. Preferably, beam failure criteria are configured for each BWP in accordance with requirements associated with services for which the respective BWP may be used.

Beam management (as described above) may thus be performed independently in respect of each activated BWP. For example, when a beam of a particular BWP satisfies the beam failure criteria applicable to that BWP, beam management resources of that BWP may be used for beam management purposes, so that the set of activated beams (or characteristics of one or more beams in the set of activated beams) for that BWP can be adjusted accordingly.

Conventionally, as described above, if all beams for a BWP satisfy the beam failure criteria, then it is necessary to initiate a beam failure recovery procedure on that BWP. However, in some embodiments, in response to a determination of beam failure with respect to one BWP, then beam management procedures using a different activated BWP may be used to modify the set of activated beams of the BWP on which beam failure has been detected. Specifically, if one or more beams of the different activated BWP do not satisfy the applicable beam failure criteria, then the one or more beams may be used for beam management procedures in respect of the BWP suffering beam failure. In some embodiments, beam management procedures may be adapted such that an indication of beam failure, such as a beam failure indication, transmitted using a first BWP indicates an identity of a second BWP, where all activated beams of the second BWP satisfy the beam failure criteria. The beam failure indication may be transmitted using layer 1 (L1) or layer 2 (L2) signalling.

Similarly, in some embodiments, beam management procedures may be adapted such that an indication, such as a beam modification message, which notifies the communications device 104 of modified, newly activated, and/or newly deactivated beams may comprise an indication of the BWP(s) to which the contents of the beam modification message relate. The beam modification message may be transmitted using layer 1 (L1) or layer 2 (L2) signalling If beam failure of all activated beams on all activated BWPs has been detected (i.e. all activated beams on all activated BWPs satisfy the respective beam failure criteria), then a single beam failure recovery procedure may be initiated using one of the BWPs.

The selection of the BWP on which to activate the beam failure recovery procedure in such circumstances may be selected in a manner similar to the process illustrated in FIG. 7 and described above. In other words, the beam failure recovery procedure may be carried out using a primary BWP if one is designated as such; otherwise, the default BWP is used if it is configured and activated. If no primary BWP is designated and no default BWP is activated, then the selection may be in accordance with a priority scheme e.g. in which the BWP having the highest sub-carrier spacing is selected.

In some embodiments, where the process of FIG. 7 is used to determine the BWP on which to perform beam failure recovery, the process may be modified as follows. If at step 530 it is determined that a primary BWP is designated, then a determination is made as to whether beam failure of all activated beams on the primary BWP has occurred. If not, the control continues to step 540 as indicated in FIG. 7. Otherwise, then it may not be possible to perform beam failure recovery using the primary BWP and control may pass to either step 550 (determination of whether default BWP is configured) or directly to step 580 (select BWP based on prioritisation scheme).

Additionally or alternatively, in some embodiments, step 580 may be carried out, instead of step 570, in response to a determination (which may be carried out prior to step 570) that beam failure of all activated beams on the default BWP has occurred.

Figure 8:
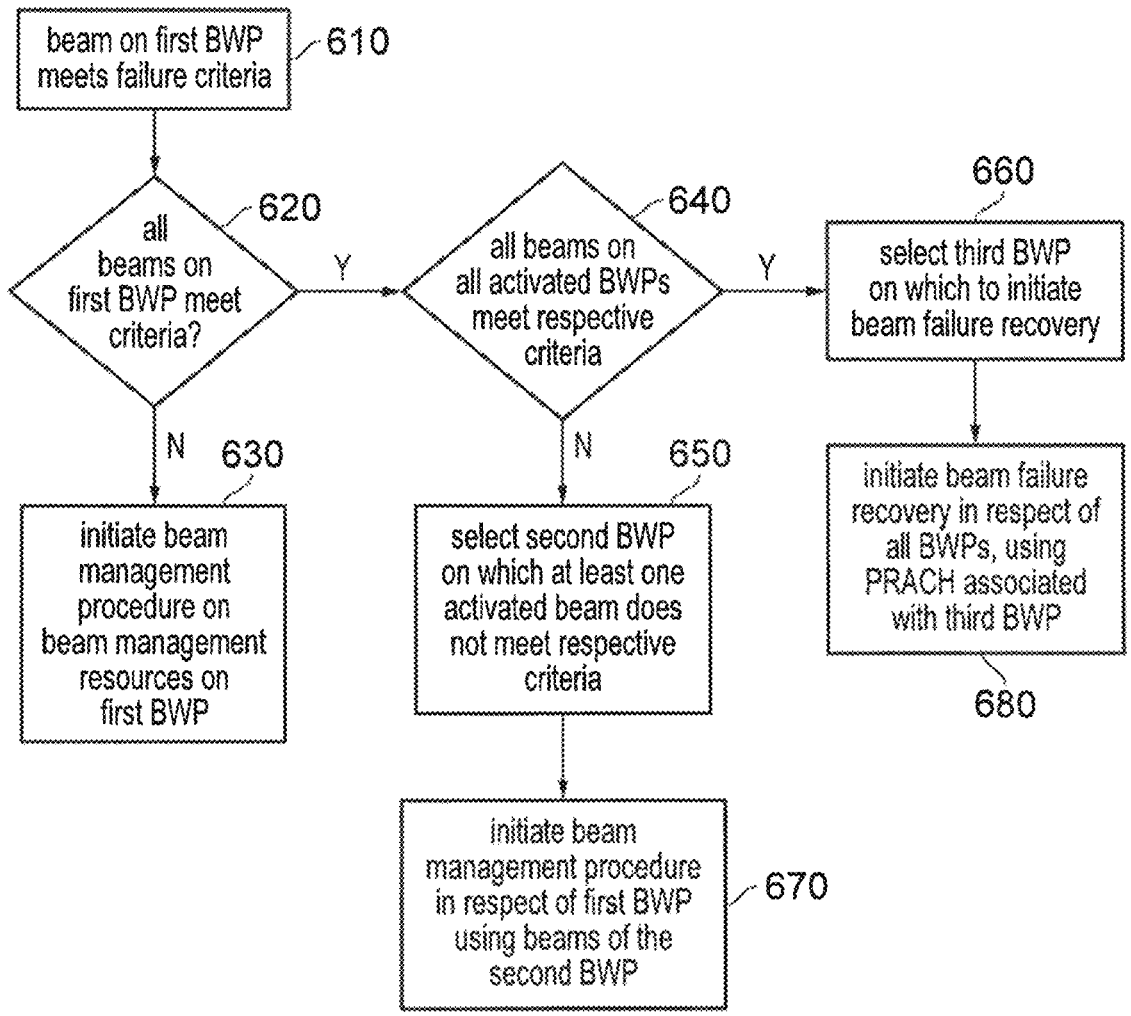
FIG. 8 illustrates a further process flow chart for a communications device in accordance with embodiments of the present technique.

FIG. 8 illustrates a process which may be carried out by the communications device 104 in response to determining that an activated beam used for an activated BWP satisfies the beam failure criteria for the activated BWP. For example, as described above, this may occur if a signal strength of quality of signals of the activated beam falls below a beam failure threshold.

The process starts at step 610 in which the communications device 104 determines that the signals received on an activated beam used for an activated BWP (for example, the first BWP 401a) meet beam failure criteria applicable to beams on the first BWP 401a.

The process continues at step 620, in which the communications device 104 determines whether all activated beams on the first BWP 401a meet the beam failure criteria applicable to the first BWP 401a.

Otherwise (for example because signals of one or more activated beams used for the first BWP 401a are measured at or above the beam failure threshold), control passes to step 630. If signals of all activated beams used for the first BWP 401a meet the beam failure criteria control passes to step 640.

In step 630, the communications device 104 initiates beam management procedures using the first BWP 401a. For example, the communications device 104 may transmit using a control channel associated with the first BWP 401a a control message which may indicate measurement results of signals of one or more activated beams and configured (but not activated) beams for the first BWP 401a.

In response to receiving the control message, the infrastructure equipment 101 may adapt characteristics of one or more of the beams configured for the first BWP 401a, and may transmit an indication to the communications device 104 to modify the set of activated beams and configured beams for the first BWP 401a.

In step 640, the communications device 104 determines whether, for each activated BWP, all activated beams for that BWP have met the applicable beam failure criteria for that BWP. If not, then control passes to step 650; if they have (in other words, all activated beams on all activated BWPs meet the beam failure criteria applicable to the respective activated BWP), then control passes to step 660.

In step 650, the communications device 104 selects, from the activated BWPs, a BWP having at least one activated beam which does not meet the applicable beam failure criteria. The selected BWP (for example, the second BWP 401b) may be selected based on a prioritisation scheme, or pre-configured. Control then passes to step 670.

In step 670, using beams of the second BWP 401b selected at step 650, the communications device 104 initiates a beam management procedure in respect of the first BWP 401a. As a result of the beam management procedure, the infrastructure equipment modifies the set of activated and/or configured beams for the first BWP 401a, and transmits using communications resources of the second BWP 401b an indication of the modified beams to be used (i.e. configured and/or activated) to the communications device 104.

In step 660, the communications device 104 selects, from the activated BWPs, a BWP (for example, the third BWP 401c) on which to initiate a beam failure recovery procedure. In some embodiments, the selection of the BWP in this step may be according to the same prioritization scheme or configuration as for selecting a BWP in step 650 for carrying out the beam management procedure of step 670. Control passes from step 660 to step 680.

At step 680 the communications device 104 initiates a beam failure recovery procedure, in respect of all activated BWPs. This may comprise the transmission of a beam failure recovery request message on a PRACH associated with the selected BWP 401*c*.

As part of the beam failure recovery procedure of step 680, the communications device 104 may carry out measurements of signals transmitted using CSI-RS or SSB associated with any beams which are configured but not activated, which are associated with any of the activated BWPs. The results of these measurements may be indicated in a transmission to the infrastructure equipment.

As such, in some embodiments, in response to determining that beam failure criteria have been satisfied in respect of one or more beams associated with a particular BWP, the communications device 104 may transmit an indication in response, to the infrastructure equipment 101 using communications resources associated with a different BWP.

According to some embodiments of the present technique, where multiple BWPs are activated, assessment of a cell's radio link quality may be determined based measurements of signals transmitted on resources associated with a primary BWP (if designated), a default BWP (if configured and activated), or in accordance with a predetermined prioritisation scheme. For example, the BWP on which resources are to be measured for the purposes of radio link quality assessment may be determined in a similar manner to the process for determining the BWP on which beam management resources are to be used, shown in FIG. 7 and described above. For example, when only one activated BWP is configured with beam management resources, radio link quality measurements may be made only of signals transmitted using resources on the BWP having the configured beam management resources.

In some embodiments, for example where beam management resources may be configured on multiple BWPs, radio link quality measurements may be made of signals transmitted using resources on one or more BWPs having configured beam management resources.

In accordance with embodiments of the present technique, there may be avoided the need to provide or configure resources for beam failure recovery on each activated BWP. In some embodiments, there may be a reduced likelihood of beam failure recovery procedure.

By providing beam failure criteria applicable to each BWP, criteria can be set appropriately for each BWP according to, for example, the service(s) provided on the respective BWP (e.g. different thresholds for beam failure detection and identification of a new beam).

Thus there has been described a communications device for use in a wireless communications network, the wireless communications network comprising an infrastructure equipment providing a wireless access interface within a system bandwidth, the system bandwidth comprising a plurality of bandwidth parts, the communications device comprising a transmitter configured to transmit signals using a plurality of activated bandwidth parts, a receiver configured to receive signals using the plurality of activated bandwidth parts, the received signals being signals transmitted using a plurality of activated beams, and a controller configured to control the transmitter and the receiver so that the communications device is operable: to determine that an activated beam associated with a first bandwidth part satisfies beam failure criteria; to select from the plurality of activated bandwidth parts a second bandwidth part; and to transmit using communications resources associated with the selected second bandwidth part a beam failure indication indicating that the activated beam associated with the first bandwidth part satisfies the beam failure criteria.

It will be appreciated that while the present disclosure has in some respects focused on implementations in an LTE-based and/or 5G network for the sake of providing specific examples, the same principles can be applied to other wireless telecommunications systems. Thus, even though the terminology used herein is generally the same or similar to that of the LTE and 5G standards, the teachings are not limited to the present versions of LTE and 5G and could apply equally to any appropriate arrangement not based on LTE or 5G and/or compliant with any other future version of an LTE, 5G or other standard.

It may be noted various example approaches discussed herein may rely on information which is predetermined/predefined in the sense of being known by both the base station and the communications device. It will be appreciated such predetermined/predefined information may in general be established, for example, by definition in an operating standard for the wireless telecommunication system, or in previously exchanged signalling between the base station and communications devices, for example in system information signalling, or in association with radio resource control setup signalling, or in information stored in a SIM application. That is to say, the specific manner in which the relevant predefined information is established and shared between the various elements of the wireless telecommunications system is not of primary significance to the principles of operation described herein. It may further be noted various example approaches discussed herein rely on information which is exchanged/communicated between various elements of the wireless telecommunications system and it will be appreciated such communications may in general be made in accordance with conventional techniques, for example in terms of specific signalling protocols and the type of communication channel used, unless the context demands otherwise. That is to say, the specific manner in which the relevant information is exchanged between the various elements of the wireless telecommunications system is not of primary significance to the principles of operation described herein.

It will be appreciated that the principles described herein are not applicable only to certain types of communications device, but can be applied more generally in respect of any types of communications device, for example the approaches are not limited to machine type communication devices/IoT devices or other narrowband communications devices, but can be applied more generally, for example in respect of any type communications device operating with a wireless link to the communication network.

It will further be appreciated that the principles described herein are not applicable only to LTE-based wireless telecommunications systems, but are applicable for any type of wireless telecommunications system that supports a random access procedure comprising an exchange of random access procedure messages between a communications device and a base station.

Further particular and preferred aspects of the present invention are set out in the accompanying independent and dependent claims. It will be appreciated that features of the dependent claims may be combined with features of the independent claims in combinations other than those explicitly set out in the claims.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

Respective features of the present disclosure are defined by the following numbered paragraphs:

Paragraph 1. A communications device for use in a wireless communications network, the wireless communications network comprising an infrastructure equipment providing a wireless access interface within a system bandwidth, the system bandwidth comprising a plurality of bandwidth parts, the communications device comprising a transmitter configured to transmit signals using a plurality of activated bandwidth parts, a receiver configured to receive signals using the plurality of activated bandwidth parts, the received signals being signals transmitted using a plurality of activated beams, and a controller configured to control the transmitter and the receiver so that the communications device is operable: to determine that an activated beam associated with a first bandwidth part satisfies beam failure criteria; to select from the plurality of activated bandwidth parts a second bandwidth part; and to transmit using communications resources associated with the selected second bandwidth part a beam failure indication indicating that the activated beam associated with the first bandwidth part satisfies the beam failure criteria.

Paragraph 2. A communications device according to paragraph 1, wherein the beam failure criteria comprises a threshold applicable to a measured characteristic of received signals, and the communications device is operable to measure the characteristic of signals received on communications resources associated with the first bandwidth part.

Paragraph 3. A communications device according to paragraph 1 or paragraph 2, wherein a one of the plurality of activated bandwidth parts is designated as a primary bandwidth part which is activated while at least one other bandwidth part is activated and the first bandwidth part is the bandwidth part designated as the primary bandwidth part.

Paragraph 4. A communications device according to paragraph 1 or paragraph 2, wherein each of the plurality of activated bandwidth parts is either a default bandwidth part having a highest activation priority or a non-default bandwidth part having an activation priority which is lower than the activation priority of a default bandwidth part, and the first bandwidth part is the default bandwidth part.

Paragraph 5. A communications device according to paragraph 1 or paragraph 2, wherein the first bandwidth part is selected from the plurality of activated bandwidth parts in accordance with a predetermined prioritisation scheme.

Paragraph 6. A communications device according to any of paragraphs 1 to 5, wherein the controller is configured to control the receiver so that the communications device is operable to receive an indication indicating that beam failure indications are to be transmitted using communications resources associated with the selected second bandwidth part.

Paragraph 7. A communications device according to any of paragraphs 1 to 6, wherein the first bandwidth part is associated with a subset of the plurality of activated beams, the controller is configured to determine that each of the subset of activated beams associated with the first bandwidth part satisfies the beam failure criteria, and the beam failure indication indicates that all activated beams associated with the first bandwidth part satisfy the beam failure criteria.

Paragraph 8. A communications device according to paragraph 7, wherein the second selected bandwidth part is selected from the plurality of activated bandwidth parts in accordance with a predetermined prioritisation scheme.

Paragraph 9. A communications device according to any of paragraphs 1 to 8, wherein the beam failure indication comprises an indication of an identity of the first bandwidth part.

Paragraph 10. A communications device according to any of paragraphs 1 to 9, wherein each of the plurality of activated bandwidth part is associated with a subset of the plurality of activated beams, the controller is configured to determine that all beams within each of the subsets of activated beams associated with each of the plurality of activated bandwidth parts satisfy the beam failure criteria, and the beam failure indication indicates that all activated beams associated with the plurality of activated bandwidth parts satisfy the beam failure criteria.

Paragraph 11. A communications device according to any of paragraphs 1 to 10, wherein the beam failure criteria associated with each of the plurality of activated bandwidth parts are the same.

Paragraph 12. A communications device according to any of paragraphs 1 to 10, wherein the beam failure criteria associated with the first bandwidth part differs from beam failure criteria associated with the selected second bandwidth part.

Paragraph 13. A communications device according to any of paragraphs 1 to 11, wherein the first bandwidth part and the second bandwidth part are the same bandwidth part.

Paragraph 14. A communications device according to any of paragraphs 1 to 12, wherein the first bandwidth part and the second bandwidth part are different bandwidth parts.

Paragraph 15. Infrastructure equipment for use in a wireless communications network, the infrastructure equipment providing a wireless access interface within a system bandwidth, the system bandwidth comprising a plurality of bandwidth parts, the infrastructure equipment comprising a transmitter configured to transmit signals to a communications device using a plurality of activated bandwidth parts and using a plurality of activated beams, a receiver configured to receive signals from the communications device using the plurality of activated bandwidth parts, and a controller, configured to control the transmitter and the receiver so that the infrastructure equipment is operable: to receive a beam failure indication indicating that an activated beam associated with a first activated bandwidth part satisfies beam failure criteria, the beam failure indication transmitted using communications resources associated with a second activated bandwidth part.

Paragraph 16. Infrastructure equipment according to paragraph 15, wherein the beam failure criteria comprises a threshold applicable to a measured characteristic of received signals.

Paragraph 17. Infrastructure equipment according to paragraph 15 or paragraph 16, wherein a one of the plurality of activated bandwidth parts is designated as a primary bandwidth part which is activated while at least one other bandwidth part is activated and the first bandwidth part is the bandwidth part designated as the primary bandwidth part.

Paragraph 18. Infrastructure equipment according to paragraph 15 or paragraph 16, wherein each of the plurality of activated bandwidth parts is either a default bandwidth part having a highest activation priority or a non-default bandwidth part having an activation priority which is lower than the activation priority of a default bandwidth part, and the first bandwidth part is the default bandwidth part.

Paragraph 19. Infrastructure equipment according to paragraph 15 or paragraph 16, wherein the first bandwidth part is selected from the plurality of activated bandwidth parts in accordance with a predetermined prioritisation scheme.

Paragraph 20. Infrastructure equipment according to any of paragraphs 15 to 19, wherein the controller is configured to control the transmitter so that the infrastructure equipment is operable to transmit an indication indicating that beam failure indications are to be transmitted using communications resources associated with the selected second bandwidth part.

Paragraph 21. Infrastructure equipment according to any of paragraphs 15 to 20, wherein the first bandwidth part is associated with a subset of the plurality of activated beams, and the beam failure indication indicates that all activated beams associated with the first bandwidth part satisfy the beam failure criteria.

Paragraph 22. Infrastructure equipment according to paragraph 21, wherein the second bandwidth part is selected from the plurality of activated bandwidth parts in accordance with a predetermined prioritisation scheme.

Paragraph 23. Infrastructure equipment according to any of paragraphs 15 to 22, wherein the beam failure indication comprises an indication of an identity of the first bandwidth part.

Paragraph 24. Infrastructure equipment according to any of paragraphs 15 to 23, wherein each of the plurality of activated bandwidth part is associated with a subset of the plurality of activated beams, and the beam failure indication indicates that all activated beams associated with the plurality of activated bandwidth parts satisfy the beam failure criteria.

Paragraph 25. Infrastructure equipment according to any of paragraphs 15 to 24, wherein the beam failure criteria associated with each of the plurality of activated bandwidth parts are the same.

Paragraph 26. Infrastructure equipment according to any of paragraphs 15 to 24, wherein the beam failure criteria associated with the first bandwidth part differs from beam failure criteria associated with the selected second bandwidth part.

Paragraph 27. Infrastructure equipment according to any of paragraphs 15 to 25, wherein the first bandwidth part and the second bandwidth part are the same bandwidth part.

Paragraph 28. Infrastructure equipment according to any of paragraphs 15 to 26, wherein the first bandwidth part and the second bandwidth part are different bandwidth parts.

Paragraph 29. Circuitry for an infrastructure equipment for use in a wireless communications network, the infrastructure equipment providing a wireless access interface within a system bandwidth, the system bandwidth comprising a plurality of bandwidth parts, the circuitry comprising transmitter circuitry configured to transmit signals to a communications device using a plurality of activated bandwidth parts and using a plurality of activated beams, receiver circuitry configured to receive signals from the communications device using the plurality of activated bandwidth parts, controller circuitry, configured to control the transmitter circuitry and the receiver circuitry so that the infrastructure equipment is operable: to receive a beam failure indication indicating that an activated beam associated with a first activated bandwidth part satisfies beam failure criteria, the beam failure indication transmitted using communications resources associated with a second activated bandwidth part.

Paragraph 30. A method or infrastructure equipment for use in a wireless communications network, the infrastructure equipment providing a wireless access interface within a system bandwidth, the system bandwidth comprising a plurality of bandwidth parts, the method comprising transmitting signals to a communications device using a plurality of activated bandwidth parts and using a plurality of activated beams, receiving signals from the communications device using the plurality of activated bandwidth parts, and receiving a beam failure indication indicating that an activated beam associated with a first activated bandwidth part satisfies beam failure criteria, the beam failure indication transmitted using communications resources associated with a second activated bandwidth part.

Paragraph 31. Circuitry for a communications device for use in a wireless communications network, the wireless communications network comprising an infrastructure equipment providing a wireless access interface within a system bandwidth, the system bandwidth comprising a plurality of bandwidth parts, the circuitry comprising transmitter circuitry configured to transmit signals using a plurality of activated bandwidth parts, receiver circuitry configured to receive signals using the plurality of activated bandwidth parts, the received signals being signals transmitted using a plurality of activated beams, and controller circuitry configured to control the transmitter circuitry and the receiver circuitry so that the communications device is operable: to determine that an activated beam associated with a first bandwidth part satisfies beam failure criteria; to select from the plurality of activated bandwidth parts a second bandwidth part; and to transmit using communications resources associated with the selected second bandwidth part a beam failure indication indicating that the activated beam associated with the first bandwidth part satisfies the beam failure criteria.

Paragraph 32. A method for a communications device for use in a wireless communications network, the wireless communications network comprising an infrastructure equipment providing a wireless access interface within a system bandwidth, the system bandwidth comprising a plurality of bandwidth parts, the method comprising transmitting signals using a plurality of activated bandwidth parts, receiving signals using the plurality of activated bandwidth parts, the received signals being signals transmitted using a plurality of activated beams, determining that an activated beam associated with a first bandwidth part satisfies beam failure criteria, selecting from the plurality of activated bandwidth parts a second bandwidth part, and transmitting using communications resources associated with the selected second bandwidth part a beam failure indication indicating that the activated beam associated with the first bandwidth part satisfies the beam failure criteria.

Further particular and preferred aspects of the present invention are set out in the accompanying independent and dependent claims. It will be appreciated that features of the dependent claims may be combined with features of the independent claims in combinations other than those explicitly set out in the claims.

REFERENCES

[1] 3GPP TS 38.300 v. 15.2.0 "NR; NR and NG-RAN Overall Description; Stage 2(Release 15)", June 2018

[2] Holma H. and Toskala A, "LTE for UMTS OFDMA and SC-FDMA based radio access", John Wiley and Sons, 2009

[3] TR 38.913, "Study on Scenarios and Requirements for Next Generation Access Technologies (Release 14)".

What is claimed is:

1. A communications system for use in a wireless communications network, the wireless communications network comprising an infrastructure equipment providing a wireless access interface within a system bandwidth, the system bandwidth comprising a plurality of bandwidth parts, the communications system comprising:
   a transmitter configured to transmit signals using a plurality of activated bandwidth parts,
   a receiver configured to receive signals using the plurality of activated bandwidth parts, the received signals being signals transmitted using a plurality of activated beams, and
   a controller configured to control the transmitter and the receiver so that the communications system is operable:
      to determine that an activated beam associated with a first bandwidth part satisfies beam failure criteria;
      to select from the plurality of activated bandwidth parts a second bandwidth part; and
      to transmit using communications resources associated with the selected second bandwidth part a beam failure indication indicating that the activated beam associated with the first bandwidth part satisfies the beam failure criteria, wherein
   one of the plurality of activated bandwidth parts is a primary bandwidth part which is in an activated state while a plurality of other bandwidth parts, each as a secondary bandwidth part, is in the activated state, and
   the beam failure indication comprises an indication of an identity of the first bandwidth part.

2. The communications system according to claim 1, wherein
   the plurality of other bandwidth parts as secondary bandwidth parts are not in the activated state at a same time, whereas said one activated bandwidth part as the primary bandwidth part is in the activated state at all times when the plurality of other bandwidth parts as secondary bandwidth parts are in the activated state and between when the plurality of other bandwidth parts as secondary bandwidth parts are in the activated state.

3. The communications system according to claim 1, wherein
   the first bandwidth part is associated with a subset of the plurality of activated beams, including said activated beam associated with the first bandwidth part,
   the controller is configured to determine that each of the activated beams of the subset of the plurality of activated beams satisfies the beam failure criteria,
   the beam failure indication indicates that each said activated beam associated with the first bandwidth part satisfy the beam failure criteria, and
   the beam failure criteria comprises a threshold applicable to a measured characteristic of received signals, and the communications system is operable to measure the characteristic of signals received on communications resources associated with the first bandwidth part.

4. The communications system according to claim UM, wherein each of the plurality of activated bandwidth parts is associated with the subset of the plurality of activated beams, the controller is configured to determine that all beams within each said subset of the activated beams associated with each of the plurality of activated bandwidth parts satisfy the beam failure criteria, and the beam failure indication indicates that all activated beams associated with the plurality of activated bandwidth parts satisfy the beam failure criteria.

5. The communications system according to claim 1, wherein each of the plurality of activated bandwidth parts is either a default bandwidth part having a highest activation priority or a non-default bandwidth part having a first activation priority which is lower than a second activation priority of the default bandwidth part, and the first bandwidth part is the default bandwidth part.

6. The communications system according to claim 1, wherein the first bandwidth part is selected from the plurality of activated bandwidth parts in accordance with a predetermined prioritization scheme.

7. The communications system according to claim 1, wherein the controller is configured to control the receiver so that the communications system is operable to receive an indication indicating that beam failure indications are to be transmitted using communications resources associated with the selected second bandwidth part.

8. The communications system according to claim 1, wherein the second selected bandwidth part is selected from the plurality of activated bandwidth parts in accordance with a predetermined prioritization scheme.

9. The communications system according to claim 1, wherein the beam failure criteria associated with each of the plurality of activated bandwidth parts are the same.

10. The communications system according to claim 1, wherein the beam failure criteria associated with the first bandwidth part differs from beam failure criteria associated with the selected second bandwidth part.

11. The communications system according to claim 1, wherein the first bandwidth part and the second bandwidth part are the same bandwidth part.

12. The communications system according to claim 1 wherein the first bandwidth part and the second bandwidth part are different bandwidth parts.

13. A non-transitory computer-readable storage medium having stored thereon instructions that, when executed by one or more processors, causes the one or more processors to perform a method for a communications system in a wireless communications network, the wireless communications network comprising an infrastructure equipment providing a wireless access interface within a system bandwidth, the system bandwidth comprising a plurality of bandwidth parts, the method comprising:
   transmitting signals using a plurality of activated bandwidth parts,
   receiving signals using the plurality of activated bandwidth parts, the received signals being signals transmitted using a plurality of activated beams,
   determining that an activated beam of the plurality of activated beams associated with a first bandwidth part of the plurality of activated bandwidth parts satisfies beam failure criteria,
   responsive to said determining that the activated beam associated with the first bandwidth part satisfies the beam failure criteria, selecting from the plurality of activated bandwidth parts a second bandwidth part that is active at a first same time as said first bandwidth part, and
   transmitting using communications resources associated with the selected second bandwidth part a beam failure indication indicating that the activated beam associated with the first bandwidth part satisfies the beam failure criteria, wherein one of the plurality of activated bandwidth parts is a primary bandwidth part which is in an activated state while a plurality of other bandwidth parts, each as a secondary bandwidth part, is in the activated state, and the beam failure indication comprises an indication of an identity of the first bandwidth part.

14. The non-transitory computer-readable storage medium according to claim 13, wherein the plurality of other bandwidth parts as secondary bandwidth parts are not in the activated state at a second same time, whereas said one activated bandwidth part as the primary bandwidth part is in the activated state at all times when the plurality of other bandwidth parts as secondary bandwidth parts are in the activated state and between when the plurality of other bandwidth parts as secondary bandwidth parts are in the activated state.

15. The non-transitory computer-readable storage medium according to claim 13, wherein the first bandwidth is associated with a subset of the plurality of activated beams, the method further comprises determining that each of the activated beams of the subset of the plurality of activated beams satisfies the beam failure criteria, the beam failure indication indicates that all activated beams associated with the first bandwidth part satisfy the beam failure criteria, and the beam failure criteria comprises a threshold applicable to a measured characteristic of received signals, and the communications system is operable to measure the characteristic of signals received on communications resources associated with the first bandwidth part.

16. The non-transitory computer-readable storage medium according to claim 13, wherein each of the plurality of activated bandwidth parts is either a default bandwidth part having a highest activation priority or a non-default bandwidth part having an activation priority which is lower than the activation priority of a default bandwidth part, and the first bandwidth part is the default bandwidth part.

17. The non-transitory computer-readable storage medium according to claim 13, wherein the first bandwidth part is selected from the plurality of activated bandwidth parts in accordance with a predetermined prioritization scheme.

18. The non-transitory computer-readable storage medium according to claim 13, wherein wherein the beam failure criteria associated with the first bandwidth part differs from beam failure criteria associated with the selected second bandwidth part.

19. Infrastructure equipment for use in a wireless communications network, the infrastructure equipment providing a wireless access interface within a system bandwidth, the system bandwidth comprising a plurality of bandwidth parts, the infrastructure equipment comprising:

a transmitter configured to transmit signals to a communications device using a plurality of activated bandwidth parts and using a plurality of activated beams;

a receiver configured to receive signals from the communications device using the plurality of activated bandwidth parts; and a controller, configured to control the transmitter and the receiver so that the infrastructure equipment is operable:

to receive a beam failure indication indicating that an activated beam associated with a first activated bandwidth part satisfies beam failure criteria, the beam failure indication transmitted using communications resources associated with a second activated bandwidth part different in at least one aspect from the first activated bandwidth part, wherein one of the plurality of activated bandwidth parts is a primary bandwidth part which is in an activated state while a plurality of other bandwidth parts, each as a secondary bandwidth part, is in the activated state, and the beam failure indication comprises an indication of an identity of the first activated bandwidth part.

\* \* \* \* \*